United States Patent Office 3,433,653
Patented Mar. 18, 1969

---

3,433,653
TRANSPARENT PLASTIC ANTIFOGGING VIEWING GLASS CONTAINING A PLASTICIZER WHICH BECOMES A WETTING AGENT BY BEING HYDROLYZED WHEN CONTACTED WITH WATER
Carl Ernst van der Smissen, Bad Schwartau, Germany, assignor to Otto Heinrich Drager, Lubeck, Germany
No Drawing. Filed Aug. 21, 1967, Ser. No. 661,815
Claims priority, application Germany, Aug. 31, 1966, D 50,987
U.S. Cl. 106—13                    1 Claim
Int. Cl. C08b 29/30; C08f 45/22; C09k 3/18

---

ABSTRACT OF THE DISCLOSURE

For antifogging, a viewing glass, such as for a face mask, is made of a transparent cellulose acetate, cellulose butyrate or polyvinyl chloride plastic containing a vinyl sulfonic acid ester as a plasticizer which plasticizer, when contacted with water, is hydrolyzed and becomes a wetting agent.

---

In my copending application Ser. No. 548,375, filed May 9, 1966, for "Sight Glass, Especially for Breathing Apparatus or the Like," I have disclosed a viewing glass made of a single layer of transparent material and containing a wetting agent for use as a transparent window, glasses, lenses, windshields, and face masks for breathing apparatus. The wetting agent is admixed with the synthetic material during the manufacture of the glass. During use, a wettable amount of the wetting agent is always on the surface of the glass. As this wetting agent is washed away from the surface of the glass, then further wetting agent diffuses from the interior of the glass to the surface so that the wetting effect is maintained. The wetting agent also constitutes the plasticizer for the synthetic material and is a little hydrophobic, and possibly slightly hydrophilic. The side of the glass directed toward the face of the user is preferably hydrophillic.

The wetting agent is admixed into the viewing glass material either before or during the manufacture of the glass.

The object of this invention is to improve upon the aforesaid disclosure in that the plasticizer which is admixed with the synthetic material is hydrolyzed when contacted with water and becomes a wetting agent. In this invention, the advantage is obtained in that the viewing glass has excellent mechanical characteristics and has the further advantage that, while the glass is being used, a wetting agent is constantly formed on the surface of the glass so that the surface does not become fogged by condensing water. The need for a further wetting agent is avoided.

All plasticizers which can be changed into a wetting agent by contact with water or even by the moisture in the air are usable for this invention. Sulfonic acid esters such as an ethyl ester of vinyl sulfonic acid is especially preferred. The following examples are given for this invention.

In general, a powder of an ester of acetyl and butyl cellulose is mixed with 15% of the plasticizer and then melted and/or sintered. However, the mixture can also be cast from a solution such as an acetone solution. The viewing glasses are then cut from the solidified melted and/or sintered material or from the solidified poured solution.

EXAMPLE 1

1 kg. of cellulose acetate was dissolved in a mixture of 6 liters of acetone and 1 liter of methylene chloride. 150 g. of an ethyl ester of vinyl sulfonic acid was introduced into this solution and stirred until dissolved. Very thin clear and transparent sheets were poured from this mixture by means of an appropriate casting apparatus and from which the viewing glasses were stamped. Alternatively, the viewing glasses were poured directly from the mixture.

EXAMPLE 2

1 kg. of cellulose butyrate was mixed with 100 g. of an ethyl ester of vinyl sulfonic acid. This mixture was homogenized in a worm gear extruder. Then the mixture was placed in a spray casting machine and then sprayed to form the viewing glasses.

EXAMPLE 3

1 kg. of polyvinyl chloride was mixed with 100 g. of a propyl ester of vinyl sulfonic acid. After the mixture was homogenized, it was placed in a spray casting machine and then sprayed to form the viewing glasses.

The viewing glasses thus produced have excellent mechanical characteristics. During use, the plasticizer in the glass and on the surface of the glass reacts with water which may be the moisture in the air and changes into a wetting agent. The formation of a fogging coat of condensed water on the glass is thus prevented. The plasticizer diffuses from the interior of the glass to the surface during the further use of the glass so that the wetting effect is maintained.

Having now described the means by which the objects of the invention are obtained, I claim:

1. A viewing glass resistant to fogging, especially for a breathing apparatus, a diving mask or the like comprising a single layer of a transparent synthetic plastic selected from the group consisting of cellulose acetate, cellulose butyrate and polyvinyl chloride admixed with about 10 to 15% of a plasticizer selected from the group consisting of the ethyl and propyl esters of vinyl sulfonic acid, said plasticizer becoming a wetting agent by being hydrolyzed when contacted by water.

References Cited

UNITED STATES PATENTS

| | | | |
|---|---|---|---|
| 2,561,010 | 7/1951 | Carson | 106—13 |
| 2,928,859 | 3/1960 | Preston et al. | 260—978 |
| 3,048,263 | 8/1962 | Sacks et al. | 106—13 |
| 3,216,840 | 11/1965 | Rouse et al. | 106—13 |
| 2,280,097 | 4/1942 | Moss | 2—14 |

ALLAN LIEBERMAN, *Primary Examiner.*

U.S. Cl. X.R.

2—14; 106—169, 196; 260—30.8; 351—62